United States Patent
Heinloth et al.

(10) Patent No.: US 8,079,789 B2
(45) Date of Patent: Dec. 20, 2011

(54) TOOL COUPLING

(75) Inventors: Markus Heinloth, Postbauer-Heng (DE); Walter Thurnwald, Stein (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 185 days.

(21) Appl. No.: 12/445,786

(22) PCT Filed: Sep. 13, 2007

(86) PCT No.: PCT/DE2007/001650
§ 371 (c)(1), (2), (4) Date: Apr. 16, 2009

(87) PCT Pub. No.: WO2008/046373
PCT Pub. Date: Apr. 24, 2008

(65) Prior Publication Data
US 2010/0316459 A1 Dec. 16, 2010

(30) Foreign Application Priority Data
Oct. 20, 2006 (DE) .......................... 10 2006 050 454

(51) Int. Cl.
*B23C 3/06* (2006.01)
*B23C 5/26* (2006.01)
*B23C 5/12* (2006.01)

(52) U.S. Cl. ............ 409/232; 409/234; 407/30; 407/51; 403/356

(58) Field of Classification Search .................. 409/232, 409/234, 199, 200; 407/30, 33, 46, 51; 408/231, 408/232, 713; 403/355, 356; 279/77, 76, 279/46.7, 66, 93, 137
See application file for complete search history.

(56) References Cited

U.S. PATENT DOCUMENTS

| | | | | |
|---|---|---|---|---|
| 5,119,995 A | * | 6/1992 | Kohler et al. | 403/356 |
| 5,800,098 A | * | 9/1998 | Satran et al. | 407/31 |
| 2002/0150422 A1 | * | 10/2002 | Shimada et al. | 403/356 |
| 2003/0039523 A1 | | 2/2003 | Kemmer | |
| 2007/0175303 A1 | * | 8/2007 | Takiguchi et al. | 83/72 |

FOREIGN PATENT DOCUMENTS

DE 7229646 12/1973
(Continued)

OTHER PUBLICATIONS

Machine translation of JP-2001-353610-A, which JP '610 was published Dec. 2001.*

Primary Examiner — Erica E Cadugan
(74) Attorney, Agent, or Firm — Larry R. Meenan

(57) ABSTRACT

The invention relates to a tool coupling for connecting a tool carrier which can be driven in a rotating manner, in particular a milling tool with a machine spindle or an adapter connected to a spindle, wherein four drivers in a crosswise formation are provided for transmitting torque between the said parts and in the clamping state engage in four recesses. To allow the tool coupling to be easily operated and to be of a simple construction, and also to counteract undesired jamming, it is proposed that the drivers respectively have on the side transmitting the torque a planar face which lies with full surface-area contact against a wall of a groove-shaped recess in the clamping state, that on the opposite side the driver has a smaller positively or frictionally engaging contact with the wall there of the groove-shaped recess and that a quick-acting clamping device is providing for the axial clamping of the tool carrier and the spindle or an adapter.

8 Claims, 2 Drawing Sheets

FOREIGN PATENT DOCUMENTS

Figures 1, 2, 3, 4:
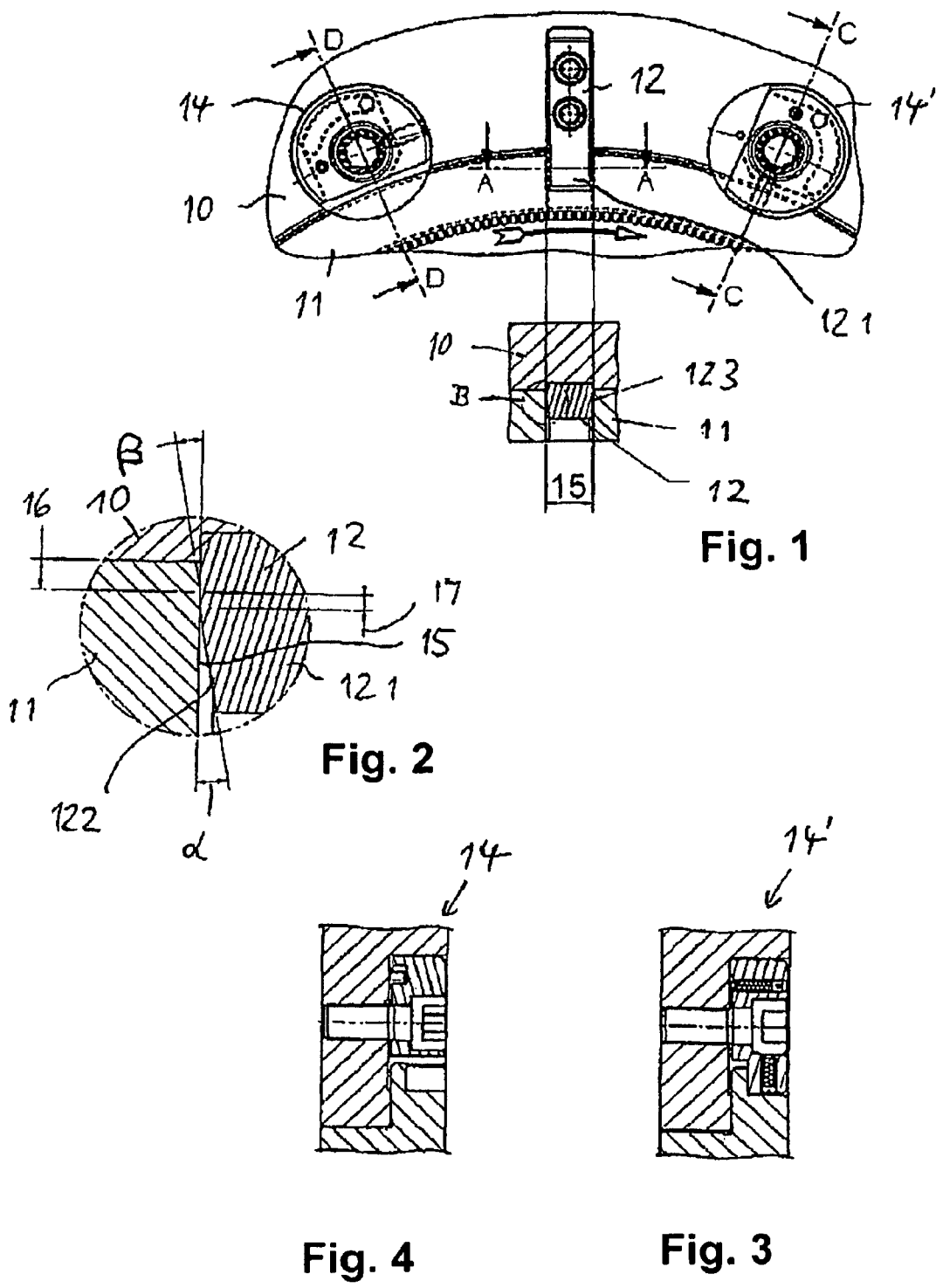

| | | |
|---|---|---|
| DE | 3438978 | 12/1985 |
| JP | 07-060529 A * | 3/1995 |
| JP | 09-011016 A * | 1/1997 |
| JP | 09-309019 A * | 12/1997 |
| JP | 2001-353610 A * | 12/2001 |
| JP | 2004-283934 A * | 10/2004 |
| JP | 2006-181708 A * | 7/2006 |

* cited by examiner

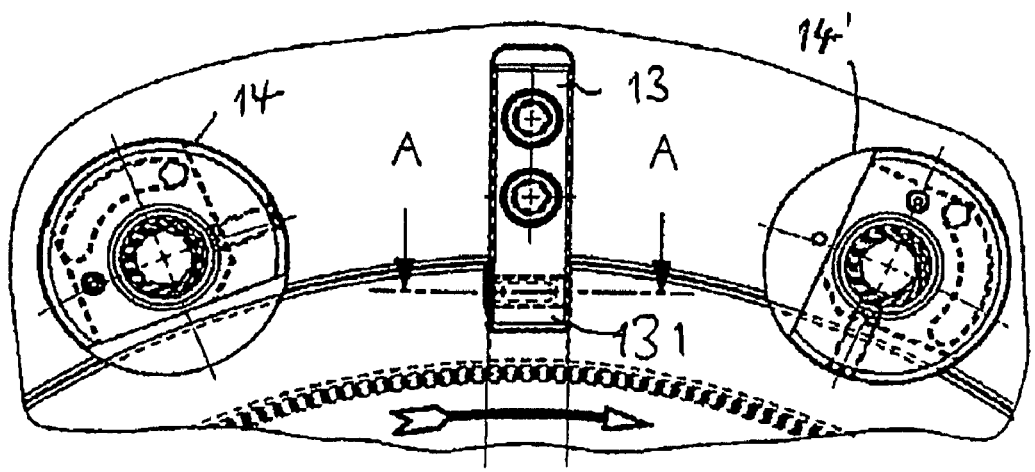
Fig. 5
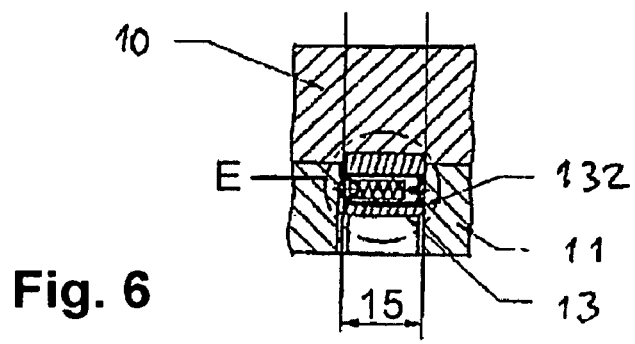
Fig. 6
Fig. 7
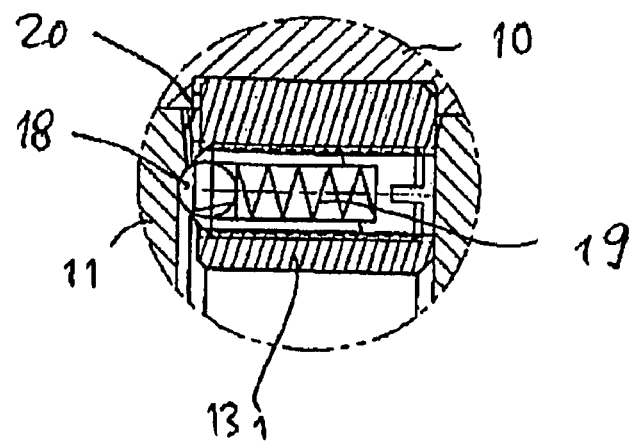

TOOL COUPLING

CROSS REFERENCE TO RELATED APPLICATIONS

This application is the US national phase of PCT application PCT/DE2007/001650, filed 13 Sep. 2007, published 24 Apr. 2008 as WO2008/046373, and claiming the priority of German patent application 102006050454.2 itself filed 20 Oct. 2006, whose entire disclosures are herewith incorporated by reference.

The invention relates to a tool coupling for connecting a rotationally drivable tool carrier, in particular a milling tool, to a machine spindle or an adapter connected to a spindle, four drivers arranged crosswise being provided for transmitting torque between said parts, said drivers engaging in four recesses in the clamped state.

In particular during the milling of crankshafts, a quick tool change after wear of the cutting inserts is required even for efficient operation. Used for crankshaft milling are external or internal milling cutters, in which the individual cutting inserts are arranged radially or tangentially on the outer periphery (in the case of the external milling cutter) or on the inner periphery (in the case of the internal milling cutter) on a tool disk or annular disk. The present invention relates to the interface between the machine spindle, or an adapter connected to the machine spindle, and an internally toothed milling tool or milling tool carrier.

In the embodiments known from the prior art, a "cross receptacle" is provided at said interface, and provided at said cross receptacle are four driver blocks which are arranged crosswise on the inner lateral surface of the spindle or adapter and by means of which the milling tool, which has slots arranged in a corresponding manner, can be centered. At the same time, the torque is transmitted from the spindle or the adapter to the milling tool. The driver blocks and the corresponding slots are arranged radially, such that, in the event of (unavoidable) heating of the tool during the milling, the milling tool can expand unhindered. Adversely, on account of the slight fitting clearance to be provided between the drivers and the slots, the fitting and removal of the tool is at times difficult. Even slight tilting of the milling tool or tool carrier may lead to jamming. The jamming between the machine spindle and the tool can often only be released with considerable and time-consuming effort, partly with the use of forcing screws or the like.

The slots, formerly of right-angled design in cross section, have therefore been designed in a wedge shape to avoid the aforesaid disadvantage. The wedge-shaped driver design can be arranged both axially (similar to a Hirth serration) and radially. The wedge-like design of the drivers (in conjunction with a corresponding design of the slots) certainly brings about an improvement with respect to the jamming, but is costly.

The object of the present invention is to provide a tool coupling which permits ease of operation, is of simple construction and counters undesirable jamming and can be produced at a low cost To achieve this object, the tool coupling according to the present invention is proposed, said tool coupling being characterized in that the drivers each have, on the side transmitting the torque, a planar surface which is in contact over the full surface area with a wall of a slot-shaped recess in the clamped state, in that, on the opposite side, the driver has a smaller positive-locking or frictional contact surface with respect to the wall there of the slot-shaped recess, and in that a quick-clamping device is provided for axially clamping the tool carrier and the spindle or an adapter.

The basic idea of the present invention proceeds from the fact that there has to be as large a degree of planar contact as possible only on the torque-transmitting side, whereas on the side remote from said contact small contact surfaces for correspondingly positioning the two tool parts relative to one another are required. The hitherto used connecting locations of the drivers, which work according to the key/slot principle, were designed in such a way that all the driver shoulders are the same size in each case. However, such a high shoulder, in consequence of the surface pressure, is only required on the torque-transmitting side of the slot/key connection. On the opposite side, however, fixing of the tool carrier to the spindle is sufficient. This fixing may be designed to be either positive-locking or frictional; at any rate relevant means for the fixing have a smaller contact surface. A quick-clamping device is provided for axially clamping the tool carrier and the spindle. With the arrangement described above, tilting or jamming can be effectively avoided. The driver and the diametrically opposite projecting means can be arranged both on the spindle and on the tool carrier; the same correspondingly applies to the correspondingly designed slot. Tool couplings which already exist can be converted without considerable outlay by the drivers being modified accordingly.

A spring-loaded body, preferably a spring-loaded ball, and a slot- or trough-shaped recess are preferably provided as the means engaging one inside the other in a positive-locking manner. The spring-loaded ball pressure piece assumes the task of fixing to the side remote from the torque transmission, wherein the relevant connection can be designed as a latching connection. Such snapping of the spring-loaded ball in place in the recess provided is clearly perceptible and facilitates the control of the primary fixing. The spring-loaded bodies may be arranged on either the spindle or the tool.

Alternatively, the driver, on the side remote from the torque transmission, may be at least partly of wedge-shaped design, preferably with a wedge angle of 10°, such that virtually linear support of the driver in the slot is obtained there in the extreme case.

For the final axial fixing of the tool carrier (milling tool) to the spindle or an adapter, a quick-clamping device is used, in particular having rotatably arranged clamping shoes which are preferably designed as eccentric clamping bodies.

The connection described above permits time-saving fitting and removal of the milling tool without considerable outlay, since the quick-clamping device is part of the machine spindle.

Further exemplary embodiments and advantages of the invention are shown in the drawings, in which:

FIGS. 1 and 5 show respective circle-segment-shaped details of a partly sectioned cross-sectional view of the connection between a milling tool and an adapter, FIG. 2 shows an enlargement of the detail B from FIG. 1, FIGS. 3 and 4 show sectional views along lines C-C and D-D, respectively, FIG. 6 shows a detailed view along section line A-A in FIG. 5, and FIG. 7 shows a view of detail E in FIG. 6.

These figures show an adapter 10, connected to a machine spindle, and a milling cutter body 11 which are connected to one another by means of four drivers 12 or 13 arranged crosswise and a quick-clamping device 14 or 14'.

As FIGS. 1 and 5 show, the drivers 12 and 13, which in the present case are fitted into the adapter 10, are designed in such a way that their torque-transmitting side 123 or 132 is designed to be planar and is in contact over the entire surface with a wall of a slot. On the opposite side, the driver 12 is of wedge-shaped design on its projecting end 121, wherein the wedge surface forms, together with the slot wall 15 in the milling tool 11, a wedge angle α, which is preferably 10°. The slip bevel 16, which is preferably formed at a bevel angle 0 of 10° on the top slot edge, leads to the driver 12 being in frictional contact with the slot wall on this side merely over a narrow contact surface 17.

FIGS. 5 to 7 show an alternative in the form of positive-locking contact, having a driver which, for the torque transmission from the adapter 10 or a machine spindle to the milling cutter body 11, has a large planar contact surface 132 and, on the opposite remote side, a spring-loaded body 18, namely a ball, on which a spring 19 acts. The projecting part 131 serves on this side merely to find a preliminary position in which the ball 18 latches in place in a corresponding slot or hollow of the milling cutter body 11. In a similar manner as in FIG. 2, a bevel 20 inclined at a small angle of, for example, 10° is provided at the top slot edge.

In the axial direction, the tool is fixed via a quick-clamping device 14, the clamping shoe of which is shown in FIG. 4 in the open position and in FIG. 3 in the clamping position. The clamping shoe is of eccentric design and can be formed as a quick-clamping body by 90° rotation.

The invention claimed is:

1. A tool coupling for connecting an adapter to a tool body having a central rotation axis, the tool coupling comprising a plurality of drivers, each driver includes a planar torque-transmitting side having a surface area that contacts a respective torque-side slot wall of the tool body when the adapter is clamped to the tool body, and a respective driver opposite side including a portion engaging a respective opposite-side slot wall, the respective opposite-side slot wall including a slip bevel portion formed at a bevel angle with respect to an axial direction of the rotation axis, the driver opposite side engaging portion having a surface area that contacts the opposite-side slot wall of the tool body when the adapter is clamped to the tool body, wherein the surface area of the driver opposite side engaging portion that contacts the opposite-side slot wall of the tool body is smaller than the surface area of planar torque-transmitting side that contacts the torque-side slot wall of the tool body when the adapter is clamped to the tool body, and wherein the torque-side slot wall does not include a slip bevel.

2. The tool coupling of claim 1, wherein the entire surface area of the respective planar torque-transmitting side contacts the respective torque-side slot wall of the tool body when the adapter is clamped to the tool body.

3. The tool coupling of claim 1, wherein the driver opposite side is wedge-shaped, and the driver opposite side engaging portion is in frictional contact with the respective opposite-side slot wall of the tool body when the adapter is clamped to the tool body.

4. The tool coupling of claim 1, wherein each driver includes a spring-loaded body and a spring for providing a biasing force against the spring-loaded body.

5. The tool coupling of claim 4, wherein the tool body includes a slot capable of receiving a portion of the spring-loaded body.

6. The tool coupling of claim 1, further comprising a quick-clamping device for clamping the adapter to the tool body in an axial direction with respect to the central rotation axis.

7. The tool coupling of claim 1, wherein the adapter is adapted to be connected to a machine spindle.

8. The tool coupling of claim 1, wherein the tool body is a milling cutter body.

* * * * *